United States Patent
Walter et al.

(10) Patent No.: US 7,665,884 B2
(45) Date of Patent: Feb. 23, 2010

(54) MIXING SYSTEM

(75) Inventors: Dirk Walter, Erlangen (DE); Richard Budin, Pfaffstätten (AT); Klaus Weigl, Mödling (AT); Ingo Ganzmann, Erlangen (DE)

(73) Assignees: Areva ANP GmbH, Erlangen (DE); Strabag AG, Vienna (AT)

( * ) Notice: Subject to any disclaimer, the term of this patent is extended or adjusted under 35 U.S.C. 154(b) by 745 days.

(21) Appl. No.: 11/343,153

(22) Filed: Jan. 30, 2006

(65) Prior Publication Data

US 2006/0176764 A1 Aug. 10, 2006

Related U.S. Application Data

(63) Continuation of application No. PCT/EP2004/005994, filed on Jun. 3, 2004.

(30) Foreign Application Priority Data

Jul. 28, 2003 (DE) ................. 103 34 593

(51) Int. Cl.
*B01F 5/04* (2006.01)
(52) U.S. Cl. ............... 366/173.2; 366/175.2; 366/337; 423/239.1
(58) Field of Classification Search ............. 366/173.1, 366/173.2, 174.1, 175.2, 181.5, 337, 338; 423/239.1
See application file for complete search history.

(56) References Cited

U.S. PATENT DOCUMENTS

| | | | |
|---|---|---|---|
| 1,218,250 A * | 3/1917 | Fox ................... | 366/183.1 |
| 4,068,830 A * | 1/1978 | Gray ................. | 366/175.2 |
| 4,498,786 A | 2/1985 | Rusheweyh | |
| 5,380,008 A | 1/1995 | Fleischli et al. | |
| 5,380,088 A | 1/1995 | Fleischli et al. | |
| 5,456,533 A * | 10/1995 | Streiff et al. ........... | 366/173.1 |
| 6,540,393 B1 * | 4/2003 | Lyons et al. ............ | 366/181.5 |
| 6,886,973 B2 * | 5/2005 | Phillips ................. | 366/181.5 |
| 7,503,686 B2 * | 3/2009 | Tarmann et al. ......... | 366/173.1 |
| 2001/0012235 A1 * | 8/2001 | Schuchardt .............. | 366/337 |
| 2002/0031046 A1 * | 3/2002 | Schneider et al. ........ | 366/181.5 |

(Continued)

FOREIGN PATENT DOCUMENTS

DE 199 34 413 A1 1/2001

(Continued)

*Primary Examiner*—David L Sorkin
(74) *Attorney, Agent, or Firm*—Laurence A. Greenberg; Werner H. Stemer; Ralph E. Locher

(57) ABSTRACT

A mixing system should, while effecting a homogeneous mixing with a low loss of pressure, have a short intermixing distance. The mixing system contains mixing elements disposed in a flow channel and have mixing blades disposed around a respective central axis. Adjacent mixing blades each have an overlap in their plane of projection to the normal plane of the central axis. An injection location for supplying a reaction medium is connected upstream from some or all of the mixing elements. The injection location is dimensioned such that the reaction medium, at its discharge from the injection location, has a discharge velocity that is increased by an excess factor with regard to the flow medium inside the flow channel. The mixing elements are dimensioned such that the quotient of the degree of overlap of adjacent mixing blades (in percent) and of the excess factor ranges from 0.1 to 5.

21 Claims, 3 Drawing Sheets

U.S. PATENT DOCUMENTS

2002/0036951 A1 * 3/2002 Brunet et al. .............. 366/337
2002/0162322 A1 11/2002 Ganzmann et al.

FOREIGN PATENT DOCUMENTS

| EP | 0 526 392 A1 | 2/1993 |
| FR | 1 372 655 | 9/1964 |
| WO | 99/05401 | 2/1999 |

* cited by examiner

MIXING SYSTEM

CROSS-REFERENCE TO RELATED APPLICATION

This is a continuing application, under 35 U.S.C. §120, of copending international application No. PCT/EP2004/005994, filed Jun. 3, 2004, which designated the United States; this application also claims the priority, under 35 U.S.C. §119, of German patent application No. 103 34 593.0, filed Jul. 28, 2003; the prior applications are herewith incorporated by reference in their entirety.

BACKGROUND OF THE INVENTION

Field of the Invention

The invention relates to a mixing system, which has a number of mixing elements which are disposed in a flow passage and have a number of mixing vanes disposed around a respective center axis. Adjacent mixing vanes of the mixing elements in their projection plane onto the normal plane to the center axis, in each case have an overlap. The mixing system further has at least one injection location for the injection of a reaction medium and is connected upstream of some or all of the mixing elements in a flow passage.

The mixing vane uniformly distributes the reaction medium flowing in via the injection locations. The injection location may be configured, for example, as a piece of tube with a nozzle as its terminating piece, which nozzle atomizes the reaction medium supplied so that it can be distributed more quickly and as homogenously as possible within a flow medium. By way of example, it is possible for various previously introduced gases to be mixed with one another in this way. Mixing systems of this type can also be used for the mixing of substances in liquid or dust form in a gas stream. It is also possible for them to be used in liquids. This type of mixing of substances in a flow passage is employed, for example, for a very wide range of catalysts. In particular for the catalytic reduction of nitrogen oxides contained in exhaust or flue gases using the selective catalytic reduction process (SCR process), it is necessary for a reducing agent in gas form to be added to the exhaust-gas or flue-gas stream that is to be deNOxed, specifically upstream of the catalyst. The reducing agent injected into the flue gas is usually an ammonia-containing gas, in particular ammonia-containing air or ammonia-containing recirculated flue gas. A homogenous and fine distribution of the injected reducing agent as far as possible throughout the entire flue-gas stream is important to achieve reliable catalytic conversion.

Known mixing systems contain one or two diverting elements, which are generally triangular in form and are anchored more or less obliquely in the flow passage. The diverting elements generate turbulence, which downstream leads to intensive mixing of the flow medium and all the components added.

However, complete mixing by mixing systems of this type is only achieved at a sufficient distance downstream of the mixing system or downstream of the diverting elements. This distance is generally referenced on the basis of the size of the passage cross section. In the case of gaseous substances, it is approximately 10 to 20 times the passage cross section. One drawback of this delayed mixing is that there needs to be sufficient space available downstream of the diverting elements before the subsequent components to which the mixture is to be fed can be connected. In industrial installations, however, this space is usually very tight and is not available to a sufficient extent.

To achieve faster or earlier mixing as seen in the direction of flow, there are mixing systems in which a plurality of small diverting elements are disposed next to one another perpendicular to the axis of symmetry of the flow passage. With mixing systems of this type, it is possible to achieve thorough mixing of the substances which have previously been introduced or gases which have previously been injected into the gas stream at a relatively short distance from the diverting elements. However, one drawback is that if a relatively large number of comparatively small diverting elements are used, while it is possible to compensate for local concentration differences in the substances to be mixed relatively quickly, large-volume concentration differences, for example between two opposite sides of the flow passage, can only be compensated for to an insufficient extent, since large-volume mixing does not take place within the flow passage.

Therefore, for more homogenous mixing, it is also possible to use mixing systems which, by a grid-like insert, divide the flow passage initially into a multiplicity of sub-passages. By using a corresponding inclination of the walls of the grid, in particular in the direction of flow at the end of the grid, it is possible to form these diverting elements. The diverting elements are alternately inclined in different directions, so that the flow is diverted in opposite directions by adjacent sub-passages. This leads to the substances to be mixed in adjacent sub-passages being swirled up and mixed, but the resultant swirling also causes the substances to be mixed with the flow through the remainder of the sub-passages. One drawback of a mixing system of this type is that the pressure drop caused by the mixing system is relatively high, on account of the extensive turbulence in the throughput of the individual outflow passages.

SUMMARY OF THE INVENTION

It is accordingly an object of the invention to provide a mixing system which overcomes the above-mentioned disadvantages of the prior art devices of this general type, which is particularly suitable for homogenous mixing with a low pressure loss and a particularly short linear path within the mixing system.

With the foregoing and other objects in view there is provided, in accordance with the invention, a mixing system. The mixing system contains a flow passage and a number of mixing elements disposed in the flow passage. The mixing elements each having a center axis and a number of mixing vanes disposed around the center axis. Adjacent ones of the mixing vanes of the mixing elements in their projection plane onto a normal plane to the center axis, in each case having an overlap. At least one injection location is provided for injecting a reaction medium and is disposed upstream of at least some of the mixing elements in the flow passage. The injection location has an exit and in each case being dimensioned such that the reaction medium at the exit, has an exit velocity being higher by an excess factor than a flow medium in the flow passage. The mixing elements are dimensioned such that a quotient formed from a degree of overlap of the adjacent mixing vanes (in percent) and the excess factor is from 0.1 to 5.

According to the invention, the object is achieved by a mixing system of the type described above, in which the injection location for feeding in a reaction medium is in each case dimensioned in such a manner that the reaction medium at its exit from the injection location, has an exit velocity which is higher by an excess factor than the flow medium in the flow passage, and in which system the mixing elements are dimensioned in such a manner that the quotient formed from the degree of overlap of adjacent mixing vanes (in percent) and the excess factor is from 0.1 to 5, in particular from 0.5 to 2.

In this context, the normal plane to the center axis is, in accordance with the usual definition, the plane to which the center axis is orthogonal. If the flow medium is routed substantially in the direction of the center axis, therefore, adjacent mixing vanes also overlap with regard to the cross section of flow for the flow medium.

In this context, the invention is based on the consideration that the objectives pursued for the mixing system, namely on the one hand an optimized mixing intensity, which ensures a homogenous concentration of the substances to be mixed even after just a short mixing path, and on the other hand a pressure loss which is as low as possible for the medium flowing through, are actually inherently contradictory requirements. This is because a mixing element in a mixing system with a higher mixing rate, which can be achieved by using a steeper setting angle of the mixing elements with respect to the flow medium, in principle generates a greater pressure loss on account of the higher resistance. For example, in addition to the resistance presented by the mixing elements themselves, the turbulence which they generate also has an increasing effect on the pressure loss.

In order nevertheless to satisfy these two contradictory configuration objectives, first a specially controlled routing of the flow medium in the region of the mixing element is provided. For this purpose, there is an intersection or overlap between adjacent mixing vanes, which as the flow medium flows through additionally triggers a mixing action or generation of turbulence for mixing purposes in the region of the overlap. Second, to improve the quality of mixing over a short mixing path, admixing of the reaction medium which is adapted to the degree of overlap of adjacent mixing vanes and is directed at controlled fine distribution of the reaction medium into the flow medium is provided. To allow this, the injection locations connected upstream of the mixing elements are provided with specific dimensions. The injection locations are in each case dimensioned in such a manner that the reaction medium, at its exit from the injection location, has an exit velocity which is higher by an excess factor than the flow medium. The matching of the dimensions of mixing elements and injection locations to one another can be described mathematically by the quotient formed from the degree of overlap of adjacent mixing vanes (in percent) and the excess factor being from 0.1 to 5, in particular from 0.5 to 2.

In this context, the degree of overlap between two adjacent mixing vanes in the axial direction of the flow passage is preferably from 5% to 100%. The excess factor is advantageously from 1 to 15, in particular from 1.5 to 5.

To further promote a suitable matching of the injection location and the mixing element, the distance between the exit of the injection location and the mixing element is preferably from 0.05 m to 2 m, in particular from 0.2 m to 0.5 m.

To keep the pressure loss in the flow passage at a particularly low level, the supply lines leading to the injection locations are advantageously disposed in succession as seen in the direction of flow of the flow medium. Consequently, at least some of the supply lines come to lie behind the upstream lines, in such a manner that they do not restrict the free cross section of flow any further and therefore themselves do not make any significant contribution to the flow resistance.

To enable the distribution profile of the reaction medium in the flow medium at the exit from each injection location to be particularly well matched to the situation-specific flow conditions in the flow passage, it is preferable for a valve to be disposed at each supply line for the associated injection location, by which valve it is possible to adjust the volumetric flow of the reaction medium.

To effectively avoid a pressure loss within a supply line by simple measures, in a further or alternative configuration the diameter of each supply line is preferably dimensioned in such a manner that the velocity of the medium in the supply lines is from 0.3 to 1 times the exit velocity at the exit of the injection location.

To enable a mixing system to be adapted to the flow velocity of the flow medium, the desired mixing quality at a predetermined distance from the mixing system and for a suitable pressure loss, it is preferably possible to vary the number of mixing vanes. The mixing system can in this way be adapted to various operating states of and demands imposed by the surrounding engineering plant, by virtue of the mixing system by way of example being adapted to the velocity and composition of the flow medium in the flow passage or by virtue of corresponding adaptation to the preset mixing quality and the preset exit velocity for further processing of the flow medium. Moreover, it is possible to alter the number of mixing vanes for optional refitting of the plant. In a particularly advantageous configuration of the mixing system, each mixing element preferably has from 3 to 8 mixing vanes.

Particularly homogenous flow conditions can be achieved by virtue of the mixing vanes preferably being disposed rotationally symmetrically around the center axis, so that adjacent mixing vanes are at a uniform angle offset with respect to one another.

To vary the parameters of a mixing system of this type, it is advantageously possible to alter the inclination of the mixing vanes with respect to the normal plane to the center axis and therefore also to the cross-sectional plane of the flow passage as early as during the production of the mixing system. By altering the angle of inclination of the mixing vanes, it is also possible to adjust the parameters of the mixing quality at a defined distance from the mixing system and the pressure loss generated by the mixing system with respect to one another. When adjusting the angle of inclination, first the resistance to the flow medium presented by the individual mixing vanes changes, and second the degree of overlap of the individual mixing vanes changes, with the result that the characteristics of the entire mixing system and/or its parameters change.

To generate turbulence in the flow medium, the mixing vanes are expediently inclined at a predetermined angle of inclination to the normal plane to the center axis and therefore also to the cross-sectional plane of the flow passage. As a result, the flow medium flowing axially through the flow passage, in the region of each mixing vane, is diverted in the circumferential direction of the flow passage, so that the resulting turbulence causes it to be mixed immediately after the mixing system. The angle of inclination of the mixing vanes is advantageously from 15° to 90°, particularly advantageously from 30° to 60°, with respect to the cross-sectional plane of the flow passage.

To achieve a sufficiently high mixing action on the part of the mixing system, the mixing vanes of all the mixing elements, in their projection onto the normal plane and therefore in the cross-sectional direction of the flow passage, expediently together cover a predetermined nominal proportion of the cross-sectional area of the flow passage. This nominal proportion is preferably from 50% to 100%. The mixing system can therefore be implemented so as to extend all the way to the edge of the flow passage, so that the mixing vanes end at the wall of the flow passage. This can be achieved by a suitable configuration of the mixing vanes both in the case of circular flow passages and in the case of flow passages with other cross sections. However, the mixing system can also be configured for a higher throughput of the flow medium in the region of the mixing system and therefore for a lower pressure loss, by virtue of the mixing vanes not extending all the way to the wall of the respective flow passage or sub-passage. The mixing action and mixing quality of a mixing system of this type is reduced compared to the embodiment described above with larger mixing vanes.

In a particularly advantageous configuration, at least one injection location is provided in the case of round and square cross sections of the flow passage. It is preferable for at least two injection locations to be provided in the case of other geometric cross sections.

A particularly homogenous and uniform distribution of the reaction medium supplied can be achieved if each injection location is advantageously in each case disposed on the center axis of the associated mixing element.

A mixing system as described above is expediently used to mix a reaction medium with a flow medium, in which case the two media differ in terms of their temperature, viscosity, density and/or chemical composition.

This type of mixing of substances in a flow passage is used in a very wide range of catalysts. In particular, a mixing system as described above is used for the catalytic reduction of nitrogen oxides contained in exhaust or flue gases using the selective catalytic reduction process (SCR process). In this case, the reaction medium which is used and injected into the flue gas, which forms the flow medium, is preferably ammonia-containing gas, in particular ammonia-containing air or ammonia-containing recirculated flue gas.

The advantages of the invention relate in particular in the short mixing distance combined with a low pressure loss in the mixing system described above, which can be achieved in particular by the overlap between the mixing vanes and the exit velocity of the reaction medium. The overlap between adjacent mixing vanes can be reduced to a region which approximately corresponds to the cross section of the flow passage. Another advantage of the mixing system is the high degree of flexibility and the options for adjustment. For example, accurate setting of the distribution of the reaction medium which is to be mixed in and therefore of the mixing quality, the mixing length and the pressure loss caused can be set by the combination of the number of mixing vanes, the degree of overlap between adjacent mixing vanes, the inclination of the mixing vanes and the exit velocity of the reaction medium.

Other features which are considered as characteristic for the invention are set forth in the appended claims.

Although the invention is illustrated and described herein as embodied in a mixing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
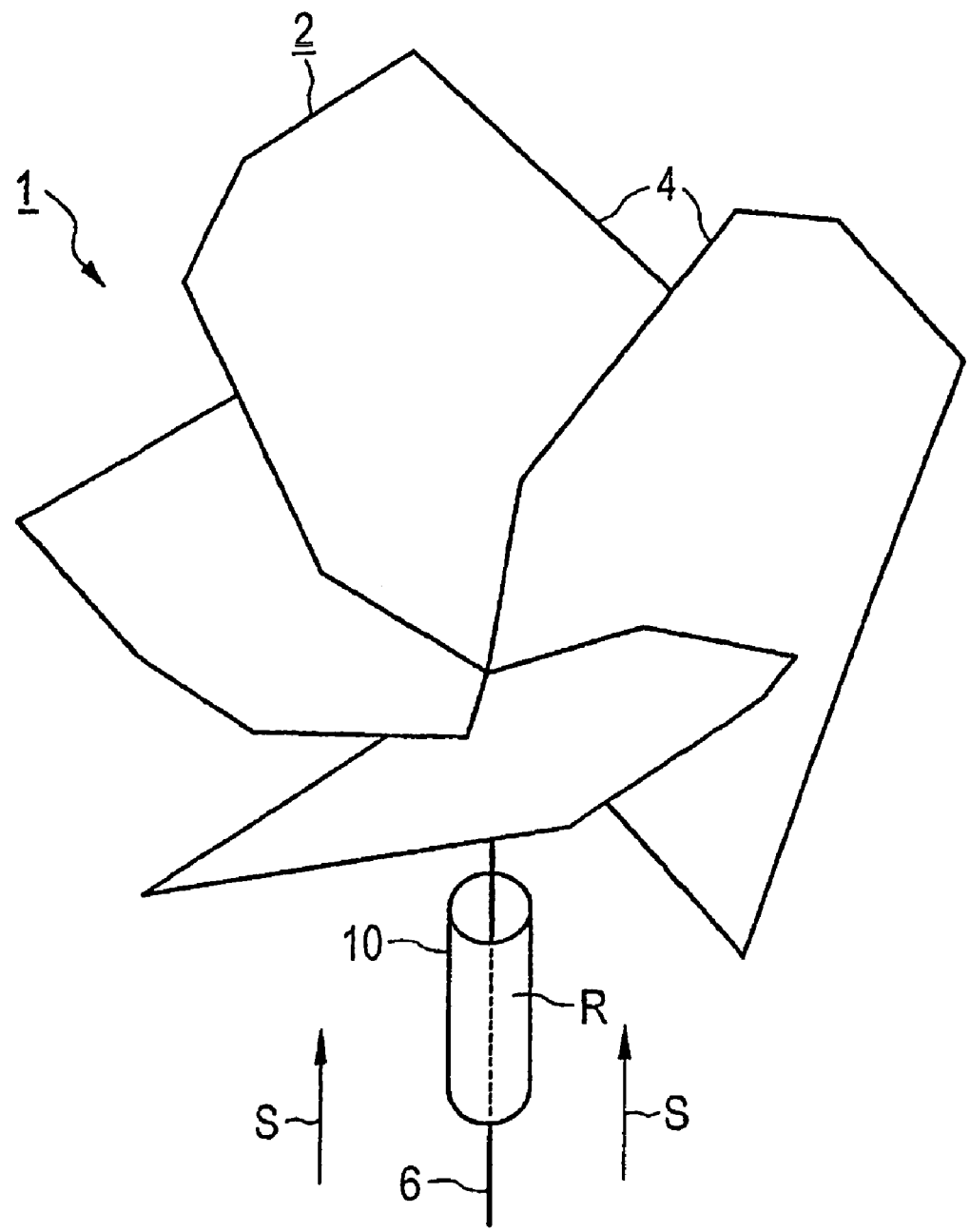
FIG. 1 is diagrammatic, perspective view of an excerpt of a mixing system with a mixing element according to the invention.

Components and elements which correspond to one another are denoted by the same designations throughout the figures. Referring now to the figures of the drawing in detail and first, particularly, to FIG. 1 thereof, there is shown a mixing system 1. The mixing system 1 contains a plurality of mixing elements 2 disposed in grid form in a mounting plane; only one of the mixing elements 2 is shown in FIG. 1, while three of the mixing elements 2 are shown in FIG. 3. In the exemplary embodiment, the mixing element 2 is composed of four inclined mixing vanes 4, which are disposed around a center axis 8 of the mixing element 2. The mixing vanes 4 are used to generate turbulence in a flow medium S routed within a flow passage 6 connected upstream of the mixing element 2. The turbulence is in this case formed by a diversion, imposed by the mixing vanes 4, of the flow medium S flowing in the axial direction of the flow passage 6, which is only shown in FIG. 2, and parallel to the center axis 8, in the circumferential direction of the flow passage 6, so as to homogenize the flow medium S. To achieve a uniform mixing action, the mixing vanes 4 are disposed at a uniform angle offset with respect to one another. In the exemplary embodiment, the angle offset is 90°.

The mixing vanes 4 may in particular be inclined at an angle of from 15° to 90°, preferably 30° to 60°, with respect to the cross-sectional plane of the flow passage 6. The mixing quality at a predetermined distance downstream of the mixing system 1, as seen in the direction of flow, with respect to the pressure loss of the flow medium S can be adjusted by this inclination.

It can be seen particularly clearly from FIG. 1 that adjacent mixing vanes 4 in each case have an overlap in their projection onto the normal plane to the center axis 8. As a result, the degree of overlap also contributes to the generation of turbulence, so that the inclination of the mixing vanes 4 can be kept at a relatively low level and as a result the pressure loss caused by the mixing system 1 can be minimized even with a high mixing action. The mixing vanes 4 of all the mixing elements 2, in their projection onto the normal plane to the center axis 8, can in this case cover a nominal proportion of 50% to 100% of the cross-sectional area of the flow passage 6, so that the flow velocity can be adapted with respect to the mixing quality.

Figure 2:
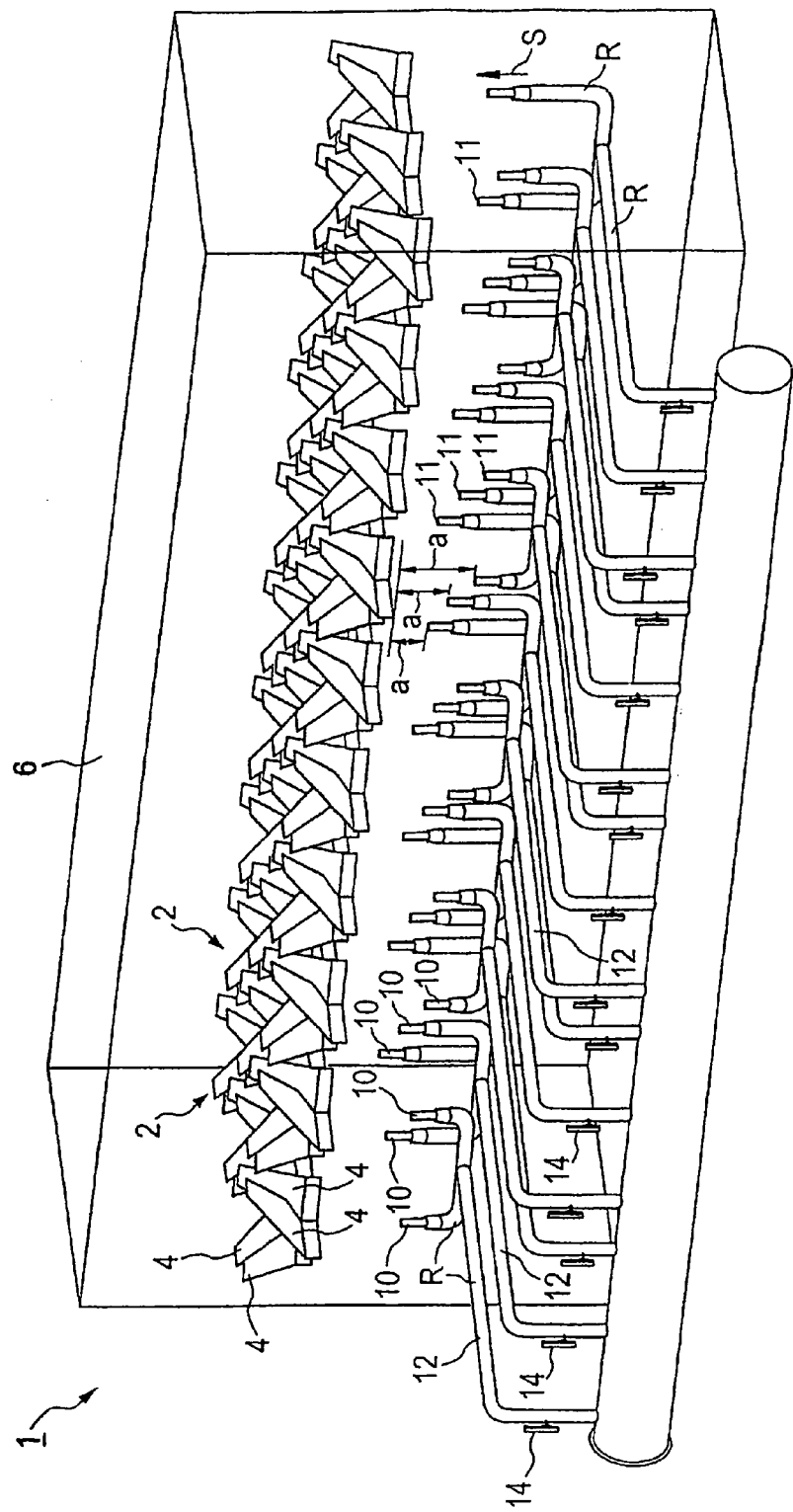
FIG. 2 is a diagrammatic, perspective view of the mixing system shown in FIG. 1.
Figure 3:
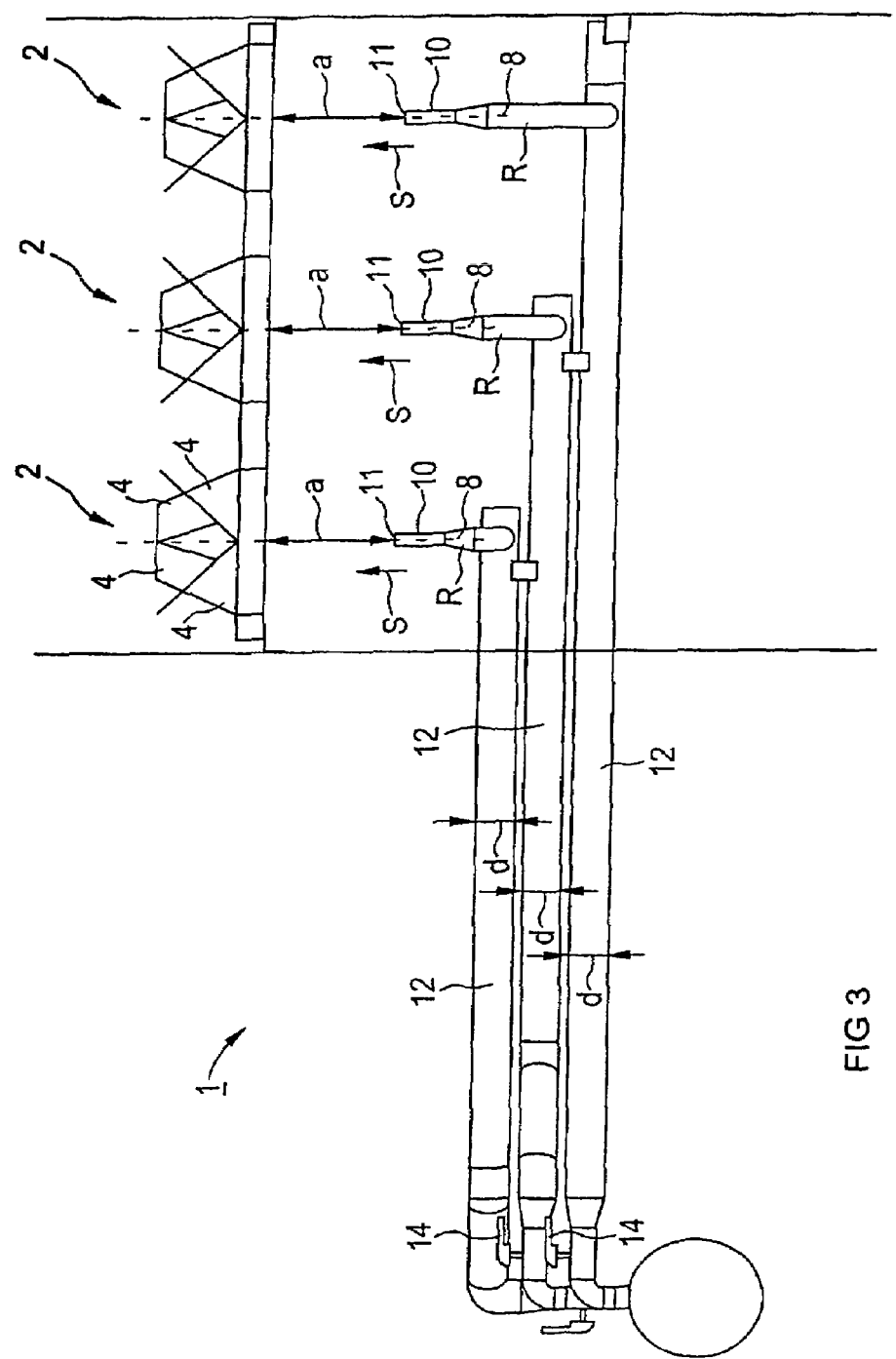
FIG. 3 is a diagrammatic, side view of the mixing system shown in FIG. 1.

In the exemplary embodiment of the flow passage 6 shown in FIG. 2, an injection location 10 for a reaction medium R is disposed on the center axis 8 upstream of each mixing element 2. The injection location 10 is in this case configured for substantial atomization of the reaction medium R and for finely distributing it in the flow medium S. When the flow medium S laden with the reaction medium R then enters the mixing element 2, the turbulence which the latter generates homogenizes the entire flow of media, so that particularly intimate and uniform mixing of flow medium S and reaction medium R is ensured.

To achieve the two fundamentally contradictory objectives for the mixing system 1, namely on the one hand an optimized mixing intensity after a short mixing path and on the other hand the minimum possible pressure loss for the medium flowing through, the dimensions of the mixing elements 2 and of the injection locations 10 are adapted to one another in such a manner that the quotient formed from the degree of overlap of two adjacent mixing vanes 4 (in percent) and the excess factor by which the exit velocity of the reaction medium R from the injection location 10 exceeds the velocity of the flow medium S in the flow passage 6 is from 0.1 to 5, in particular from 0.5 to 2.

To further promote the appropriate matching between the injection location 10 and the mixing element 2, the distance a between an exit 11 of the injection location 10 and the mixing element 2 is preferably from 0.05 m to 2 m, in particular from 0.2 m to 0.5 m (see FIG. 3).

As shown in FIG. 2 and FIG. 3, each injection location 10 is assigned a supply line 12. A plurality of supply lines 12 are disposed behind one another in the direction of flow, as can be seen in particular from FIG. 3. This keeps the pressure loss in the flow passage 6 at a particularly low level.

Furthermore, a valve 14 is disposed at each supply line 12 for the associated injection location 10. As a result, the volumetric flow of the reaction media R can be individually metered and set, so that the distribution profile of the reaction medium R in the flow medium S can be influenced particularly quickly and effectively.

In a further configuration, in the exemplary embodiment the diameter d of each supply line 12 is dimensioned in such a manner that the velocity of the media in the supply lines 12 is from 0.3 to 1 times the exit velocity at the exit 11 of the injection location 10. This effectively avoids a pressure loss within the supply line 12 by a simple measure.

We claim:

1. A mixing system, comprising:
   a flow passage;
   a plurality of mixing elements disposed in grid formation next to one another in a common mounting plane as seen in a direction of flow in said flow passage, said mixing elements each having a respective center axis and a plurality of mixing vanes disposed around said center axis, adjacent said mixing vanes of respective said mixing elements in a projection plane onto a normal plane to said center axis, in each case having an overlap; and
   at least one injection nozzle for injecting a reaction medium being disposed upstream of at least some of said mixing elements in said flow passage, said injection nozzle having an exit and in each case being dimensioned such that the reaction medium at said exit, has an exit velocity being higher by an excess factor than a flow medium in said flow passage, and said mixing elements dimensioned such that a quotient formed from a degree of overlap of said adjacent mixing vanes (in percent) and the excess factor is from 0.1 to 5.

2. The mixing system according to claim 1, wherein said degree of overlap between said adjacent mixing vanes is from 5% to 100%.

3. The mixing system according to claim 1, wherein the excess factor is from 1 to 15.

4. The mixing system according to claim 3, wherein said excess factor is from 1.5 to 5.

5. The mixing system according to claim 1, wherein a distance between said exit of said injection nozzle and said mixing elements is from 0.05 m to 2 m.

6. The mixing system according to claim 5, wherein said distance is from 0.2 m to 0.5 m.

7. The mixing system according to claim 1,
   wherein said at least one injection nozzle is one of a plurality of injection nozzles; and
   further comprising supply lines leading to said injection nozzles, said supply lines disposed in succession as seen in a direction of flow of the flow medium.

8. The mixing system according to claim 7, further comprising valves for setting a volumetric flow of the reaction medium, one of said valves disposed in each of said supply lines.

9. The mixing system according to claim 7, wherein said supply lines each have a diameter dimensioned for setting a velocity of the reaction medium in said supply lines to be from 0.3 to 1 times an exit velocity at said exit of said injection nozzle.

10. The mixing system according to claim 1, wherein each of said mixing elements has from 3 to 8 of said mixing vanes.

11. The mixing system according to claim 1, wherein said mixing vanes are disposed with a uniform angle offset around said center axis.

12. The mixing system according to claim 1, wherein said mixing vanes are inclined at an angle of inclination of 15° to 90° to the normal plane to said center axis.

13. The mixing system according to claim 12, wherein said angle of inclination is 30° to 60°.

14. The mixing system according to claim 1, wherein said mixing vanes of all said mixing elements, in their projection onto the normal plane to said center axis, cover a nominal proportion of from 50% to 100% of a cross-sectional area of said flow passage.

15. The mixing system according to claim 1, wherein:
   said flow passage has a cross section with a shape selected from the group consisting of round cross section shapes, square cross section shapes, and other geometric cross section shapes;
   in a case of said round or square cross section shapes of said flow passage at least one said injection location is provided; and
   in a case of said other geometric cross section shapes of said flow passage at least two of said injection nozzles are provided.

16. The mixing system according to claim 1, wherein each said injection nozzle is assigned to a respective one of said mixing elements, and disposed on said center axis thereof.

17. The mixing system according to claim 1, wherein the reaction medium is an ammonia-containing gas.

18. The mixing system according to claim 17, wherein the ammonia-containing gas is selected from the group consisting of ammonia-containing air and ammonia-containing recirculated flue gas.

19. The mixing system according to claim 1, wherein the excess factor is from 0.5 to 2.

20. A method mixing a reaction medium with a flow medium, which comprises the steps of:
   providing the reaction medium and the flow medium to differ in terms of temperature, viscosity, density and/or chemical composition;
   providing a mixing system, containing:
      a flow passage;
      a plurality of mixing elements disposed in grid formation next to one another in a common mounting plane as seen in a direction of flow in the flow passage, the mixing elements each having a respective center axis and a plurality of mixing vanes disposed around the center axis, adjacent mixing vanes of respective mixing elements in a projection plane onto a normal plane to the center axis, in each case having an overlap; and
      at least one injection nozzle for injecting a reaction medium being disposed upstream of at least some of the mixing elements in the flow passage, the injection nozzle in each case being dimensioned such that the reaction medium at an exit from the injection nozzle, has an exit velocity being higher by an excess factor than a flow medium in the flow passage, and the mixing elements dimensioned such that a quotient formed from a degree of overlap of the adjacent mixing vanes (in percent) and the excess factor is from 0.1 to 5; and mixing the reaction medium and the flow medium in the mixing system.

21. A method of treating an exhaust or flue gas being a flow medium in an SNCR or SCR process, which comprises the steps of:

providing a mixing system, containing:

a flow passage;

a plurality of mixing elements disposed in grid formation next to one another in a common mounting plane as seen in a direction of flow in the flow passage, the mixing elements each having a respective center axis and a plurality of mixing vanes disposed around the center axis, adjacent mixing vanes of respective mixing elements in a projection plane onto a normal plane to the center axis, in each case having an overlap; and at least one injection nozzle for injecting a reaction medium being disposed upstream of at least some of the mixing elements in the flow passage, the injection nozzle in each case being dimensioned such that the reaction medium at an exit from the injection nozzle, has an exit velocity being higher by an excess factor than a flow medium in the flow passage, and the mixing elements dimensioned such that a quotient formed from a degree of overlap of the adjacent mixing vanes (in percent) and the excess factor is from 0.1 to 5; and mixing the reaction medium and the flow medium using the mixing system.

* * * * *